INVENTOR.
JOHN M. WITHERSPOON
BY
Joseph P. Kates
ATTORNEY

INVENTOR.
JOHN M. WITHERSPOON
BY Joseph P. Kates
ATTORNEY

United States Patent Office 3,222,536

Patented Dec. 7, 1965

3,222,536

TIME-CONTROLLED LOGICAL CIRCUIT

John M. Witherspoon, Malvern, Pa., assignor to Burroughs Corporation, Detroit, Mich., a corporation of Michigan Filed Feb. 2, 1961, Ser. No. 87,057
7 Claims. (Cl. 307—88)

The present invention relates to time-controlled logical operations of binary information. More particularly it relates to gating circuits employing bistable state magnetic storage devices wherein on and off switching control of trains of pulses by a single pulse is effected. The information and switching pulses need not be synchronous with each other.

In the operation of electronic computing equipment having circuits for performing logical operations a switch is frequently required to select the logical circuits which perform the desired logical operation. The logical operation is to be performed only so long as a preferred condition of the computer control system known as a state exists. Circuits which perform mathematical logic channel the information through a series of gates to obtain the desired result. Should a different result be desired a different channel is selected. The present invention eliminates requirements of channeled logic devices for multiplicity of complex circuits and eliminates excess equipment.

Bistable state storage devices, hereinafter referred to as cores, generally take the form of a small toroidal transformer ring. Such bistable state cores do not require continuing current in the circuits for maintaining the magnetic storage permanent. Information stored in these cores can be stored asynchronously and can subsequently be sensed or driven out by a synchronized pulse. It is desirable to employ circuit means to perform logical operations on the information in a given circuit channel which does not depend critically upon synchronized information and switching pulses.

Output signals from magnetic core circuits are derived either by sensing the state of the core without destroying the state or by switching the state of the core. In logical circuits where a series of pulses representing information follows the same path it is desirable to switch the state of the cores with transfer pulses. Because the switching destroys the state of the cores it is desirable to provide means which maintains or resets an original core condition. The means provided should be simple, selectively operable and capable of being controlled by single timed pulses.

In the invention a Ping-pong time-control circuit capable of non-destructive read-out information provides a train of pulses which are started, continued and cut-off in accordance with predetermined desired control by a single start pulse and a single end pulse. This train of pulses conditions an "AND" gate to permit information pulses to be channeled through in accordance with this predetermined desired control.

An object of the invention is to provide an improved time delay trigger circuit utilizing a minimum number of cores in a device employing magnetic cores for logical operations.

Another object of the invention is to provide a circuit in which a logical operation may be inhibited for a predetermined time period, or alternatively altered to perform a new logical operation for a predetermined time period.

A further object of the invention is to provide an improved switching circuit to perform time-controlled logical operations on binary information in which the information pulses need not be synchronous with the switching pulses.

Another object of the invention is to provide means to govern a synchronous train of pulses by an asynchronous information pulse and to govern asynchronous pulses by a synchronous information pulse.

Other objects and advantages of the invention will be apparent during the course of the following description of the invention and accompanying drawings, in which.

Referring to the figures, the bistable magnetic storage devices are shown as circles. These storage devices have high magnetic remanence characteristics. Although the devices are depicted as being individual toroidal cores, it is understood that the invention is not limited to devices of this geometry. The convention followed in schematic representation is described in articles such as that entitled, "Magnetic Core Circuits for Digital Data-Processing Systems," on page 154 of the February 1956 issue of the Proceedings of the IRE by D. Loev, W. Miehle, J. Paivinen and J. Wylen, but the distinction between solid and open arrows of that article are not made herein.

Each of the cores is supplied with windings for producing a magnetic flux therein in response to current flow in these windings. As conventional current flows into the dotted winding terimnal, the core associated with such winding will tend to store a "0." Conversely if the current flows into an undotted winding terminal, the core associated with such winding will tend to store a "1." The signals, storage condition and currents are arbitrarily chosen to illustrate two distinct storage conditions and do not necessarily imply pulses of reverse magnitudes. In the figures, an arrow touching the core indicates the direction of information flow and a "1" or "0" inside the circle indicates the set of the core upon the arrival of said information. A double arrow is used in FIG. 1 to illustrate an inhibit function. The simultaneous arrival of an information pulse on a double arrow line with an information pulse on a single arrow line will inhibit or prevent the normal store action of a core by its single arrowed information line. A Y-branch line could also have been shown to indicate inhibiting. The double arrow line is indicative of one means for inhibiting which is effected by overpowering the single arrow line input. The information stored in an individual core device is transferred to an output winding by transfer pulses arriving at "$2n$" even time, or "$2n+1$," odd times.

Figures 1, 3:
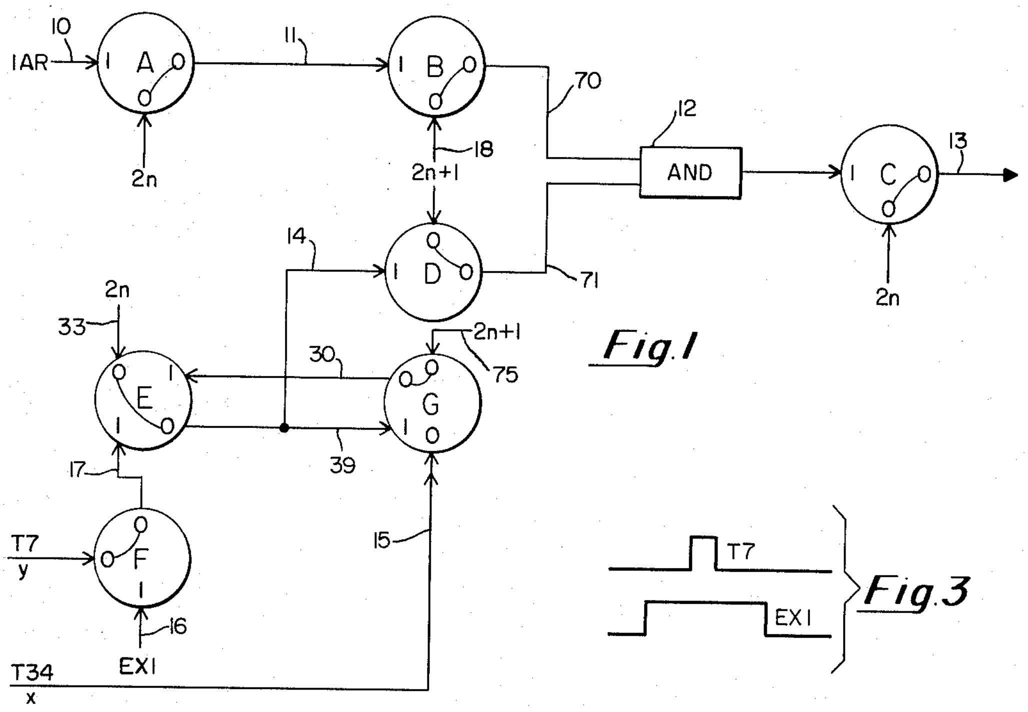
FIG. 1 is a diagrammatic representation of an illustrative embodiment of the logical time-controlled gating circuit of the invention.
FIG. 3 is a diagram illustrative of the duration of the pulses of the initiating input signal and execute information input signals.

Referring to FIG. 1, seven bistable state storage devices, magnetic cores A, B, C, D, E, F and G, and an "AND" gate circuit 12, are provided. Core A has a pair of inputs comprising line 10 on which information pulses enter, and that from a source of even time input pulses $2n$. The output winding of core A is connected to the input winding of core B through transfer means 11. The pair of inputs to "AND" gate circuit 12 are applied from the outputs of cores B and D through connection means 70 and 71. The output of the AND gate 12 is applied to the input of core C. Core C provides output to output means 13. This output comprises a series of channeled information pulses which are time-controlled to start and end at a predetermined time. Execute information command signals applied through input means 16 and a pulse to initiate the information applied through means Y are connected as inputs into core F. Transfer means 17 is connected between the output of core F and the input of core E. Core E also has an input 33 to which are applied even-time pulses $2n$. Additional input is provided by transfer means 30 from the output of core G. Cores E and G are connected in a Ping-pong arrangement to provide Ping-pong means. Output from core E is applied along transfer means 39 to one input of core G. The output of the Ping-pong means is applied to transfer means 14 to a first input to core D. Cores B and D each have additional inputs from a source 18 of odd-time clock pulses $2n+1$. Odd-time pulses $2n+1$ are applied to an input 75 to core G. An inhibit input is applied to core G along input means 15 from a pulse source X so as to overpower the input derived from input transfer coil 39 when a pulse is applied. This inhibit pulse is applied, for examle, at time T34. The pulse to initiate operations applied to core F from source Y may be initiated at time T7.

Figure 4:
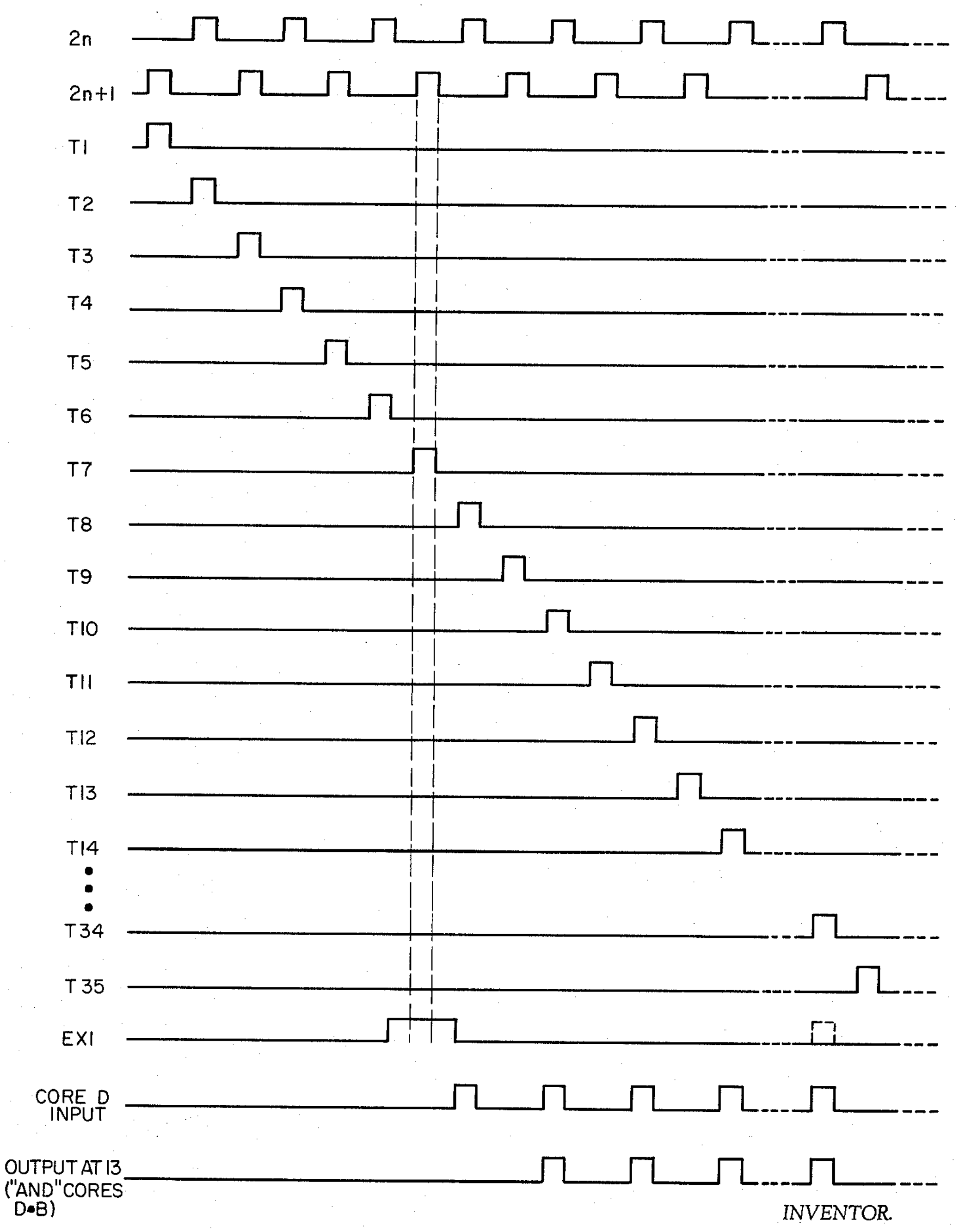
FIG. 4 is a pulse-time curve diagram presenting waveforms to illustrate the timing relationships of the train of pulses, the even and odd pulses, the execute information pulse, the core D input, and the output which occurs in operation of the illustrative embodiment of FIGS. 1 and 2.

Referring again to FIG. 1 and also to FIG. 4, the information to be channeled, IAR is applied to core A on input means 10 during odd time or between the occurrence of two even pulse times. The subsequent arrival of a transfer pulse at $2n$, even time to core A from the even time input drives the information stored in core A to core B along transfer means 11. Core B then stores either a "1" or "0" according to the information previously stored in core A. The information in core B is advanced through the AND gate configuration 12 to core C by the odd time transfer pulse $2n+1$ acting on core B. It will be observed that information arriving on input line 10 to core A during odd time will appear on output line 13 from core C during the next succeeding odd time provided that the AND gate configuration 12 is in the proper conditioned state to allow the information through the gate. One method of conditioning the AND gate 12 is to set core D during even time when the information from line 11 is being advanced from core A to core B. Should core D be set in the "1" state each even time, the information arriving at core B will be passed through the AND gate 12 without alteration, but should the core D be set in the "0" state, and remain at "0," there will be no pulses on line 14 during even time; no transfer will take place and core C will remain set in the "0" state. If both cores B and D are set in the "1" state a transfer during odd time will set core C in the "1" state, but should either core B or D be in a "0" state a transfer during odd time will not set core C to the "1" state. It will be noted that the odd and even time advance pulses will always set the cores to their "0" states. The AND gate 12 referred to above can be that shown on page 143 of the book, "Digital Applications of Magnetic Devices," edited by A. J. Meyerhoff, G. H. Barnes, S. B. Disson and G. E. Lund, published by John Wiley and Sons, 1960, New York City.

Referring to the lower-most portion of FIG. 1 the switch portion of the circuit consists of cores E, F and G combined in circuitry commonly referred to as a Ping-pong configuration comprising the Ping-pong means of the cores E and G circuits and the core F circuit which provides the input core means for the Ping-pong means. This configuration may be similar to that described and claimed in U.S. Patent No. 2,946,988 to William Miehle for "Non-Destructive Magnetic Storage," issued July 26, 1960, and assigned to the Burroughs Corporation.

The Ping-pong configuration is used to supply the desired pulse train on line 14. Should core F be set in the "1" state and subsequently advanced during odd time $2n+1$ to set core E in the "1" state, the advance pulse on core E during even time $2n$ will set both cores D and G in the "1" state. The pulse on line 14 which sets core D in the "1" state, conditions core D as part of the AND configuration so that the set of core B will be advanced to core C. At the same time core D is advanced core G is advanced resetting core E. When core E is again advanced during even time the "1" set of core E again sets both cores D and G, so that the "1" originally transferred to core E will alternately be transferred out and transferred back thus causing core D to be set during each even time advance of core E. The original "1" set of core F serves to keep the AND gate 12 open to pulses arriving from core B.

The AND gate 12 is open as long as core F is set in the "1" state from input EX1. At time T7 this "1" is transferred to core E. From then on the "1" is reset into core E at every odd time interval because of the Ping-pong and the AND gate 12 is conditioned on every even time interval by core D.

In order to close the AND gate once it is opened it is only necessary to apply an inhibit pulse on line 15 from source X during even time. An inhibit pulse on line 15 prevents core G from being set to the "1" state (it overrides the "1" from core E), but it does not prevent core D from being set to the "1" state. A next sequential transfer pulse occurring on core E at even time $2n$ does not set a "1" into core D thus closing the AND gate to the information being set in core B.

Referring to FIG. 4, illustrating the pulse time curve, the even time pulses $2n$ and the odd time pulses $2n+1$, respectively, are illustrated on the first two lines respectively. The $2n$ pulses occur at times T2, T4, T6, T8, etc. The $2n+1$ pulses appear at odd times T1, T3, T5, T7, T9, etc. The individual pulses T1, T2, T3, etc. which may comprise a train of 40 pulses, for example, are illustrated on the waveforms labelled T1, T2, . . . T35 . . . . The waveform labelled EXI illustrates the Execution Information Command signal. In the illustrative embodiment, this is shown also in FIG. 3 as an asynchronous pulse of longer duration (at least two times) than the synchronous pulses for the worst state condition. The worst case condition is when the initiating pulse T7 occurs at the same time as the execute information pulse. In order to insure operation in this case, the initiate pulse either by overriding or by sufficiently long simultaneous occurrence with the core F in the 1 state as shown in FIG. 3 insures transfer of the one ("1") along output line 17 to start the Ping-pong means. The pulse shown in phantom at the right hand side of the EXI waveform of FIG. 4 demonstrates that if any of the pulses outside of the period of T7 is used as the EXI command there is no "worst case" problem, since core F is set into the one state by this EXI pulse before the T7 initiate pulse arrives. The T7 pulse then initiates transfer of state after the pulse outside of the T7 period has put core F into the one state. Thus, there is no problem where either asynchronous or synchronous pulses outside the period of the initiating pulse is utilized as shown by the phantom wave on the EXI waveform line, but where a single asynchronous pulse is utilized which may occur at any time, it should meet the requirements of the relationships of FIG. 3 herein.

The core D input waveform of FIG. 4 comprises a train of pulses which starts at time T8 since the initiating pulse utilized by the embodiment is the T7 pulse and there is a one T time delay for the input into core E. Thus, the input into core D occurs at time T8 and the pulses continue until the overriding terminating pulse T34 applied along means 15 inhibits further action of the Ping-pong means. The output at means 13 waveform of FIG. 4 is the "anded" input from cores D and E which passes through and gate 12 and through core C. By delay through the cores as set forth hereinabove, the first output pulse occurs at time T10. The output pulses occur on the output means 13 at even times T10 to T36 provided that core D has been set in the one state at even times T8 to T34.

In the embodiment shown, pulses arriving at core B on line 11 occurring at even times T8 to T34 ($2n$) would occur on the output line 13 at even times T10 to T36 provided that core D had been set in the "1" state at even times T8 to T34. The "1" state that occurred at core D had originally been set into core F on line 16 at even time T6, and transferred on line 17 to core E. The inhibit pulse on line 15 is inserted at even time T34. Thus, series of pulses are allowed to pass through an AND gate controlled only by a single start and a single end pulse.

hTe start pulse may arrive at input EXI at time T6. The inhibit pulse arriving at input X at time T34 is the single end pulse. The selective train of pulses arrives at core A and is set into core C. Input at input EXI starts the train of pulses coming through but it takes four time intervals from the input to core F because the pulse input at Y at time T7 delays one pulse, the delay from core E to core D delays to time T8, a delay to time T9 occurs for input into C and the pulse arrives at the output at time T10.

The opposite effect can be achieved of controlled inhibit of the pulses arriving at the cores by reversing start and inhibit pulses. The pulse on line 14 may be used as an inhibit to core B through appropriate switching means.

Figure 2:
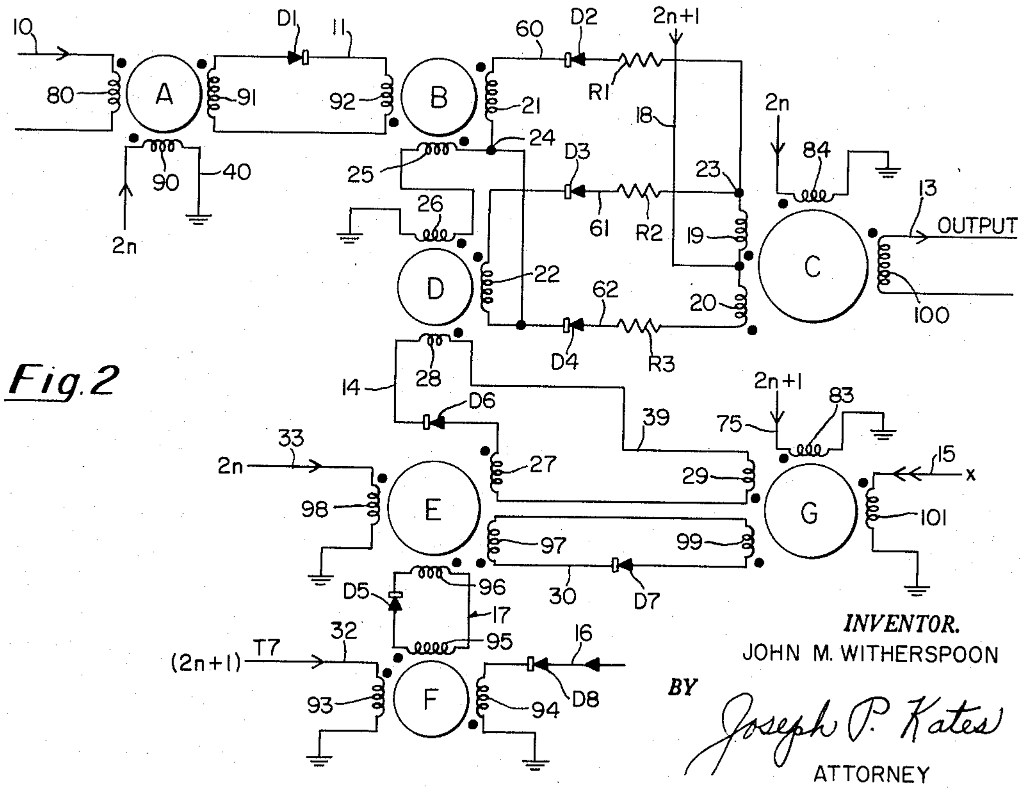
FIG. 2 is a schematic diagram of a construction of the circuit of FIG. 1.

Referring to FIG. 2 core A has an input winding 80 connected to the input line 10 from which the IAR pulses are applied. The input line 40 supplies the $2n$ even-time transfer pulses to winding 90 so that output is applied through transfer loop 11 from the output winding 91 of core A to the input winding 92 to core B. A plurality of diodes D1, D2, D3, D4, D5, D6, D7 and D8 are provided and are chosen such as to conduct sufficient current to transfer into the "1" state and prevent backward flow of information in accordance with requirements for the single diode transfer loops in which they appear. Resistors R1, R2 and R3 minimize effects of variation in diode forward resistance and may actually be provided by use of resistance wire for the turn windings. Output core B has an output winding 21 and a helping winding 25 which form part of the transfer loop to apply input to AND circuit 12. AND circuit 12 includes a pair of input windings 19 and 20 to core C. In the presence of odd-time pulses $2n+1$ from line 18 applied to the junction between output windings 19 and 20, the transfer loop effects transfer of state to core C along line 60, through diode D2 and resistor R1 to the winding 19. Core F is provided with input winding 93 into which the odd time starting pulses T7 is applied through line 32. It has an input winding 94 into which the EXI pulses are applied through winding 16 and through the diode D8. Output transfer loop 17 is a single diode transfer loop and comprises a core F output winding 95, a core E input winding 96 and a diode D5. The core E circuit includes input line 33 from the source of even time pulses $2n$ and an input winding 98. Core E input winding 97, diode D7 and core G output winding 99 comprise a single diode transfer loop 30. A second transfer loop 39 comprises core E output winding 27 and core G input winding 29. Core D input winding 28 and line 14 and the diode D6 are connected between windings 27 and 29 to provide Ping-pong output into core D. Upon application of odd time pulses $2n+1$ to input line 75 and through the winding 83 of core G, core E is reset by transfer from winding 29 to winding 27 and simultaneous transfer is effected through line 14, also of loop 39, to core D by insertion of a pulse into winding 28. Core D has a helping winding 26 disposed between core B helping winding 25 and ground. A core D output winding 22 conveys output to winding 20 of the AND gate 12 through diode D4 along line 62 and to winding 19 through diode D3 and line 61. Core C is provided with the input windings 19 and 20, an output winding 100 connected to output line 13 and an input winding 84 into which is applied even time pulses $2n$. Odd time pulses $2n+1$ are applied at the junction between input windings 19 and 20 of core C from line 18. A core G input winding 101 receives inhibit pulses from source X along line 15 to stop the Ping-pong.

Referring again to FIG. 2, a "1" state may be set in core A by pulses arriving on line 10. The input from line 10, on transfer by even time $2n$ occurring pulses on winding 40 to line 11 arrives as a positive pulse which sets core B into the "1" state. Similarly, the positive pulse on line 14 sets core D. With both cores B and D set a transfer pulse is applied on line 18 at odd time $2n+1$ to the center terminal of a split winding comprising winding sections 19 and 20. Core C at this time is in the zero state and the lower winding 20 offers a low impedance current path while winding 19 offers a relatively high impedance current path. If either core B or D are in the "0" state their respective windings 21 and 22 have a low impedance current path from terminal 23 to terminal 24 and through the reset help windings 25 and 26 to ground. If both cores B and D are assumed set in the "1" state no low impedance path exists between terminals 23 and 24. Then the transfer pulse current applied to the center terminal at time $2n+1$ is largely shunted through the lower winding 20 setting core C in the "1" state. The same pulse current from winding 20 passes through windings 25 and 26 to help reset cores B and O. A smaller pulse current from the center terminal also flows through winding 19 to windings 21 and 22 which aids in resetting cores B and D, but this current flow in winding 19 is not sufficient to prevent the shift of core C to the "1" state. As explained hereinabove should either core B or D be in the "0" state a larger pulse current from the center terminal flows through winding 19 which is sufficient to balance the effect of current flow in winding 20 and prevent the setting of core C in the "1" state. Desirable effects are achieved by having windings 21 and 22 with a greater number of turns than windings 19, 20, 25 and 26.

Line 14 is a transfer loop having winding 27 on core E, winding 28 on core D and winding 29 on core G. As in most magnetic core transfer loops it is desirable to have a smaller number of turns on output windings 28 and 29 than on output winding 27. Line 30 is a transfer loop from core G to core E. Line 17 is a transfer loop from core F to core E. Line 16 is the start input set line to core F. State "1" set into core F by line 16 is advanced out of core F by line 32 onto transfer loop 17 which sets core E into state "1." Line 33 advances the "1" set from core E to cores D and G on transfer loop 14. Line 15 is an inhibit line. The end pulse which may arrive at time T34 on line 15 is overpowering which causes core G to be driven to the "0" state. This closes the AND gate at time T36.

Referring to FIG. 3, wherein is shown the duration of drive pulse T7 compared to the duration of the execute instruction word pulse EXI, the duration of pulse EXI must be longer than the drive pulse T7. Pulse EXI must overlap T7 by at least a factor of 2 to insure transfer to start the Ping-pong at time T8 to condition the AND gate at time T10 which is required for correct timing and routing of instructions from the Instruction Address Register. The instruction address register pulses IAR arrive on line 10 to register A and are transferred by transfer pulses at even times $2n$ applied to core A to advance the state of core B.

By the above-described means a series of pulses are allowed to pass through an AND gate controlled only by a single start and a single end pulse. The invention thereby permits a logical operation to be inhibited for a predetermined period or to perform a new logical operation for a predetermined time period by an improved time delay trigger means and switching circuit in which the information and switching pulses need not be synchronous. The means shown enables control of a synchronous train of incoming information pulses by a single input asynchronous pulse.

It is to be understood that the form of the invention, herewith shown and described, is to be taken as a preferred example of the same, and that various changes such as in arrangement of parts, values and components may be resorted to without departing from the spirit of my invention, or the scope of the claims.

What is claimed is:

1. Operation control means comprising an AND gate, a first core responsive to transfer pulses to condition said gate ON when in predetermoined set core state, Ping-pong means to set said first core, second core means responsive to information signals and to a start pulse to start said Ping-pong means, inhibit means to stop said Ping-pong means, third core means responsive to transfer pulses to provide input to said gate when in predetermined set core state, means to set said third core periodically, means to effect transfer simultaneously of said first and third core output at a time which is asynchronous to the means in which said third core periods are being set.

2. Means for providing time-controlled logical operations on binary information, said means comprising an input information pulse receiving core to provide a first train of information pulses, an AND gate to pass through said first train of pulses when said gate is conditioned, means to condition said gate comprising a Ping-pong core means, an output core responsive to said Ping-pong means to be set in a "1" state, means to trigger said Ping-pong means at a predetermined instant, inhibit means to stop said Ping-pong means at a predetermined instant and core means responsive to second pulses which are asynchronous with respect to said first pulse train to cause said output core to set said AND gate to first pulse train passing condition.

3. Time-controlled means to provide signal output of predetermined start, duration and stop time comprising a first bistable device connected to be turned on responsive to an information signal input and an odd time receiving signal input, a second bistable device connected to be turned on responsive to execute information input and said odd time recurring signal input, an AND gate responsive to on condition of said first and second devices to provide said predetermined output, means responsive to a predetermined time occurring single triggering pulse to provide a continuous train of execute information pulses and responsive to a predetermined time occurring inhibit pulse to stop said continuous train, said continuous train means being connected to provide execute information pulses to said second device after initiation by said triggering pulse until after said inhibit pulse has effected stoppage.

4. The means of claim 3 including a third bistable device responsive to information signal input to be set and to even time recurring signal input to transfer the state at which said third device is set to said first device on every even recurring signal period for subsequent application to said AND gate by said first device at every odd recurring time.

5. The device of claim 4 including a fourth bistable device connected to said continuous train means responsive to execute signal input to be set and to said trigger pulse to transfer said execute pulses to activate said continuous pulse train means.

6. Operation control means comprising an AND gate, first, second, third, fourth, fifth, sixth and seventh magnetic core devices, said fifth and seventh cores being connected in Ping-pong arrangement to provide Ping-pong means, a source of even time synchronous recurring pulses, a source of odd time recurring pulses each occurring between the times of occurrence of said even pulses, a source of information pulses and a source of at least one information executing pulse, a source to supply an initiating action pulse at a predetermined time, a source to supply an inhibit pulse at a predetermined action cut-off initiating time, said first core being responsive to said information pulses and said even time pulses to transfer said information pulses to said second core, said sixth core being responsive to said execute pulses and said initiate action pulses to activate said Ping-pong means, said fourth core being responsive to the output of said Ping-pong means and to said odd pulses to condition said AND gate on, one of said Ping-pong cores being responsive to said inhibit pulse to stop Ping-pong action, said third core being responsive to output of said AND gate to become set and being responsive to said even pulses to provide transfer out of said AND gate output at a predetermined time delay after input of information and execute pulses and until said delay after input of an inhibit pulse.

7. A time-controlled logical circuit to effect correct timing and routing of data signals comprising a train of information input pulses comprising at least one execute pulse and a train of execute pulses asynchronous to said information input pulses, said circuit comprising a source of even and of odd time recurring clock pulses, a source of an initiating and of a terminating pulse, a first bistable state storage device responsive to said information pulses to have its state set accordingly, a second bistable storage device, state transfer means connected between the output of said first device and the input of said second device, means responsive to said even pulses to transfer the state of said first device to said second device, third, fourth, fifth, sixth and seventh bistable state storage devices, said fifth and seventh bistable state storage devices being interconnected in circuit to provide Ping-pong means to sequentially transfer a "1" storage state back and forth between said fifth and said seventh devices, said sixth device being responsive to said execute pulse to become set in a "1" state, said execute pulse being of longer time duration than and including the time duration of said initiate pulse, transfer means disposed between said sixth and said fifth devices to transfer the "1" state of said sixth device which triggers the Ping-pong means action upon occurrence of said initiate pulse, said Ping-pong means being responsive to said source of a terminating pulse to cease Ping-pong action of said Ping-pong means, transfer loop means connected between said Ping-pong transfer means and said fourth bistable device to transfer state of said fifth core into said fourth core, an AND gate connected between said second and fourth devices and said third device, said second and fourth devices being responsive to said pulses from said odd pulse source such that the information and execute pulses are applied through said AND gate to set said third bistable device accordingly and means responsive to said even pulse source to effect output from said third core.

References Cited by the Examiner

UNITED STATES PATENTS

| | | | |
|---|---|---|---|
| 2,857,586 | 10/1958 | Wylen | 340—174 |
| 2,946,988 | 7/1960 | Michle | 340—174 |

IRVING L. SRAGOW, *Primary Examiner.*

JOHN F. BURNS, *Examiner.*

UNITED STATES PATENT OFFICE

CERTIFICATE OF CORRECTION

Patent No. 3,222,536 December 7, 1965

John M. Witherspoon

It is hereby certified that error appears in the above numbered patent requiring correction and that the said Letters Patent should read as corrected below.

Column 1, line 10, for "of" read -- on --; column 3, line 12, for "to", first occurrence, read -- by --; line 18, for "39" read -- 29 --; column 5, line 7, for "hTe" read -- The --; column 6, line 20, for "cores B and O" read -- cores B and D --; column 7, line 6, for "predetermoined" read -- predetermined --; line 15, for "periods" read -- means --; column 8, lines 21 and 22, strike out "comprising at least one execute pulse"; line 22, before "asynchronous" insert -- comprising at least one execute pulse --.

Signed and sealed this 25th day of October 1966.

(SEAL)

Attest:

ERNEST W. SWIDER
Attesting Officer

EDWARD J. BRENNER
Commissioner of Patents